426-365. CR FE19,868 EX
Exa
Feb. 25, 1936. G. GRINDROD Re. 19,868
FOOD PRODUCT AND PROCESS OF MANUFACTURING THE SAME
Original Filed June 21, 1928 3 Sheets-Sheet 1
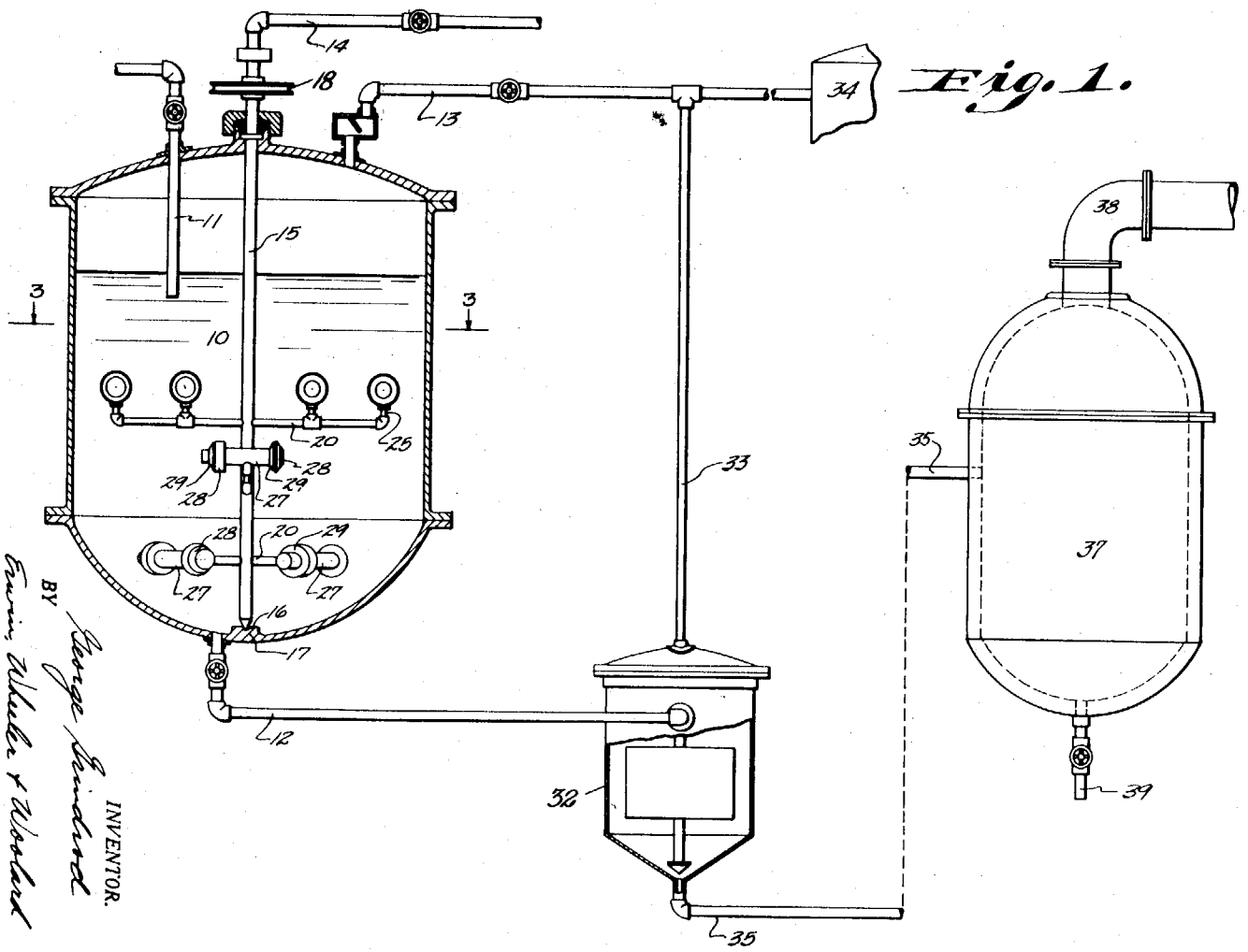
INVENTOR.
George Grindrod
BY
Erwin, Wheeler & Woolard
ATTORNEYS

99. FOODS AND BEVERAGES
55

Exam

Feb. 25, 1936. G. GRINDROD Re. 19,868

FOOD PRODUCT AND PROCESS OF MANUFACTURING THE SAME

Original Filed June 21, 1928 3 Sheets-Sheet 2

INVENTOR.
George Grindrod
BY
Erwin, Wheeler & Woolard
ATTORNEYS

Feb. 25, 1936. G. GRINDROD Re. 19,868

FOOD PRODUCT AND PROCESS OF MANUFACTURING THE SAME

Original Filed June 21, 1928 3 Sheets-Sheet 3

INVENTOR.
George Grindrod
BY
Erwin, Wheeler & Woolard
ATTORNEYS

99. FOODS AND BEVERAGES
55
Examin

Reissued Feb. 25, 1936

Re. 19,868

UNITED STATES PATENT OFFICE 19,868

FOOD PRODUCT AND PROCESS OF MANUFACTURING THE SAME

George Grindrod, Oconomowoc, Wis., assignor to Grindrod Process Corporation, Waukesha, Wis., a corporation of Wisconsin Original No. 1,798,120, dated March 24, 1931, Serial No. 287,184, June 21, 1928. Application for reissue March 23, 1933, Serial No. 662,367

17 Claims. (Cl. 99—55)

My invention relates to improvements in food products and processes of manufacturing the same.

My object is to transform protein containing food and other food materials,—not containing pectin and cane sugar,—into hydrated colloids each capable of solidification as a jelly and having a characteristic or quality of resistance to bacterial attack and penetration similar to that of ordinary fruit jelly.

My invention is based upon the discovery that it is possible by the direct action of high velocity steam jets, to completely destroy certain substances in food, such as the globulin of milk, and to cause the free albumen to become adsorbed upon fat or redispersed as a stable colloidal solution, and that casein or similar proteins in such food will then become resistant to coagulation; also that the destruction of the globulin and the re-dispersion of the albumin in the manner above recited makes it possible to then concentrate a mass of the material so treated into a jelly, impenetrable to bacteria and other micro organisms, and which then may be kept indefinitely. If the product is free of those bacteria capable of growth in it, it will keep permanently.

It is an object of my invention to utilize this discovery in the provision of means for transforming food material, or compounds other than fruit juices, into hydrated colloids capable of prolonged storage, which retain the natural flavors of materials used, which are unchanged chemically, at least in so far as the substances contributing to their food value are concerned, and many of which materials or compounds may be readily restored to their original condition in appearance, flavor and nutritive quality.

A still further object is to provide means for preserving sterile and semi-sterile foods other than solidified hydrated colloids by a protective covering or coating composed of such a colloid, the food to be preserved preferably having its protein substances made resistant to coagulation by the method herein described.

More specific objects are to provide improved means for preserving milk, milk products, milk compounds and mixtures by transforming them into jellies; for similarly preserving gelatin without injury to its gelatinizing power; for projecting finely divided meats by mixing them with gelatin and transforming the mixture into a sterile stabilized hydrated colloid in which the sterilized meat particles are embedded; for treating cereals and cereal containing materials under conditions which will transform such materials into colloids capable of hydrating when properly concentrated and cooled; and in general, to provide a substantially universally available means for preserving foods in the form of jellies, free from obnoxious or injurious chemical change and flavor change, and capable of being kept without deterioration in open containers for a period of time sufficient to satisfy all ordinary commercial requirements.

Before describing my improved process in detail, it will be desirable to set forth certain discoveries made by me in the course of my experiments and particularly in connection with the use of processes and apparatus disclosed in my Patent Numbers, 1,714,597, dated May 28, 1929; 1,819,023, dated August 18, 1931; 2,020,309, dated November 12, 1935; and 1,797,769, dated March 24, 1931, all of which disclose apparatus of general types adaptable for use in practicing this process. For the process herein described, the equipment shown in said co-pending applications will be available, if constructed for delivery of steam jets of the requisite size, number, distribution and velocity.

In the above mentioned former applications I disclosed processes and apparatus for sterilizing milk and other liqui-form food products by injecting steam directly into the material under conditions which promote rapid sterilization at low temperatures as distinguished from other methods and apparatus in which heat is applied either externally to a container in which the material has been placed or internally under prolonged high pressure and temperature conditions.

Pasteurization by direct injection of steam into milk and other food materials has long been practiced and in some instances the process has been sufficiently prolonged to accomplish sterilization in a closed or substantially closed container within which pressure is allowed to build up to a point where the desired sterilizing temperature may be maintained for the required period. But in my Patent No. 1,714,597 I have shown and described a process and apparatus in which steam is injected into the bottom portion of a kettle, from which the steam is allowed to escape continuously during the treatment and in the use of such apparatus I discovered that complete sterilization of milk could be accomplished within a surprisingly short period of time, without material change in food value or flavor. This appears to be due to the searing effects of direct contact and the disruptive effect of the impacts of high velocity steam jets upon living organisms and the resultant rapid temperature and pressure changes within the organisms, as distinguished from the slow and prolonged application of heat and external pressure to such organisms which necessarily result from the use of the apparatus and methods heretofore employed.

In the use of the apparatus disclosed in my Patent No. 1,714,597 I discovered that the time interval of exposure to heat can be shortened, the required degree of heat reduced, the tendency to chemical change and flavor change also reduced in proportion to the velocity of the steam at the time of contact with the milk, and the degree of uniformity and certainty of the exposure of each particle to such contact with particles of steam.

I find that by using nozzles having very small and numerous orifices, the total capacity of which is less than that of the steam supply pipe, and by using steam at sufficient pressure and utilizing these orifices instead of the control valve as the limiting factors regulating the steam supply to the milk, it is possible with such apparatus to sterilize milk in bulk on a large commercial scale and successfully preserve the normal flavor.

But I also find that by delivering steam through these small orifices under high velocity, the milk is stabilized to such an extent that it will stand approximately 90 minutes of heat treatment at sterilizing temperatures in a can, whereas ordinary milk under the same conditions will coagulate if the heat treatment is prolonged materially beyond an interval of 16 or 17 minutes. I also find that milk and other materials may be stabilized even before sterilization has been accomplished, and to such a degree as to be highly resistant to coagulation.

A particle of steam moving at a velocity of approximately 1400 feet per second appears to be effective to completely destroy any living cell with which it directly contacts, even if the heat does not exceed 230° F., which is below the temperature of thermal sterilization, and any particle of material moving into actual momentary surface contact with a jet of steam having such a velocity and temperature, becomes completely sterile within not exceeding 2 minutes of exposure to that treatment. Even that short time interval and temperature is not required for the extermination of any but the more highly resistant spores, and it is quite possible that all of them are instantly destroyed if exposed to the actual and direct impact of a particle of steam.

In the use of kettles for sterilizing batches of food materials it is desirable to allow a certain degree of pressure to build up within the kettle or container, to develop a sterilizing temperature which will preclude reinfection, but this is not necessary for stabilization against coagulation and the maintenance of such temperature may not be necessary for any other reason. It is desirable to remove the food material from its influence and reduce the temperature of the material as quickly as possible after the steam impact treatment and completion of sterilization if sterilization is desired.

The means disclosed in my above mentioned Patents Nos. 1,819,023, 2,020,309, and 1,797,769 were designed for more fully, certainly and in a more direct order of succession, subjecting the food particles to the direct impact of one or more particles of steam and then passing such food particles out of the path of the steam jets, whereby each particle of food could be removed from the influence of heat as soon as sterilization was accomplished. In this manner the time interval required for sterilizating each particle can be reduced. The danger that some particle may escape direct contact with high velocity steam particles can also be reduced or wholly eliminated and the dependence upon ebullition or agitation for bringing the particles of food into the paths of steam jets can also be reduced or possibly eliminated.

Experiments along these lines led to the discovery that the stabilization of the milk by fine high velocity steam jets as above set forth, is due to the destruction of the globulin and similar substances in the milk and to the fact that the albumen is redispersed as herein described. I find that when this is done, the casein (which is considered to be in the form of calcium caseinate in milk) and other protein material is stabilized and made resistant to coagulation and that the material so treated can then be concentrated to a critical point where it will hydrate and jell upon cooling to normal atmospheric temperature.

I have discovered an important fact concerning hydrated colloids which appears to have been unrecognized heretofore. It is an inherent characteristic of a solidified hydrated colloid that bacteria cannot penetrate it, even if it contains abundant water for their growth. If the bacteria are scattered through the liquid mass before it solidifies, each organism will grow into a colony, but if the mass is sterile, the bacteria may cause a surface growth which, however, remains on the surface and does not penetrate.

If the surface becomes dry, a film of partially hydrated colloid is formed which is analogous to a skin and thereafter bacteria cannot grow even on its surface. I find that the complete characteristics of fruit jelly are not primarily dependent upon the presence of sugar, but upon this inherent characteristic of the solidified hydrated colloidal state. But fruit jelly is a unique substance, dependent for its formation upon the presence of pectin and cane sugar and the process employed in the manufacture of fruit jelly is therefore not applicable to materials other than fruit. However, fruit jelly is a good example of a permanently keeping solidified hydrated colloid.

It appears to be an invariable law that when a sterile colloid combines with all of the water present it then becomes impenetrable to bacteria. They cannot move in it and their digestive enzymes cannot penetrate it. Meat and other natural hydrated colloids are susceptible to spoilage because their fibres or cellular structures are filled with liquid.

Casein is the protein in colloidal form in milk, but it must be transformed from a heterogeneous solution or mass into a jelly in order to acquire a keeping characteristic. If milk, either with or without heating, is concentrated to about 50 to 60 per cent total solids, the casein passes into the state of hydration, but does not stay in that state because the albumen and globulin are not removed and they are at least partly responsible for the coagulability of casein. They coagulate and in so doing initiate coagulation of the casein. By redispersing or destroying the globulin and by redispersing the albumen in a new colloidal form which is stable, I find that the casein also becomes stable. It is probable that the same process changes the structure of the casein molecule also. Whatever the change, the casein becomes resistant to coagulation and susceptible to hydration.

My object is to utilize these discoveries for the preservation of food products generally, and my process will now be described as it is carried out with the aid of apparatus of three quite widely different types.

In the accompanying drawings:

Figure 1 is a sectional and elevational view of apparatus disclosed in my Patent No. 1,797,769.

Like parts are identified by the same reference characters throughout the several views.

Figure 3:
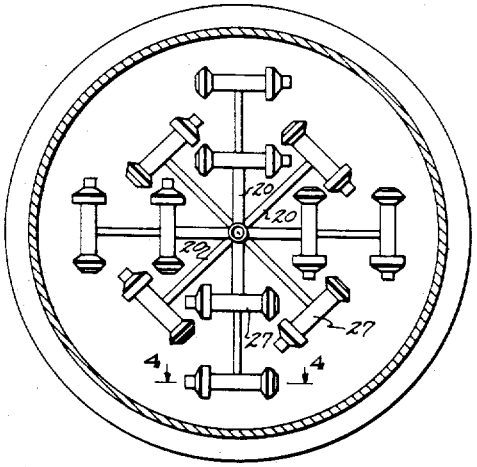
Figure 3 is a section, taken on line 3—3 of Figure 1.

I will now describe my process as it is used for transforming milk and milk products into jellies which are stable, and highly resistant to bacterial action, but which can readily be restored to the original form by the addition of water.

In the practice of my process for this purpose, I inject steam into fresh milk through a multiple series of minute nozzles from which the steam escapes at a high velocity, such, for example, as a velocity of about 1400 feet per second, the steam pressure ranging from 25 to 50 pounds or more per square inch (above atmospheric pressure) against a resistance which should be somewhat above atmospheric pressure, but which is preferably not more than 58 per cent of the steam pressure, for otherwise the velocity of the steam will be reduced and the sterilizing and stabilizing efficiency of the jets will be correspondingly reduced.

In practice I prefer to allow a pressure to build up over the surface of the milk to approximately 6 to 10 pounds above atmospheric pressure in order that a sterilizing atmosphere may be maintained above the surface of the milk so that particles thrown into this atmosphere by ebullition will not be reinfected. This allows the milk to reach a temperature of about 230° F. to 240° F. I also prefer to employ steam at a gage pressure of about 50 pounds.

When using the apparatus illustrated in Figure 1, the milk, or other material in liqui-form condition, (preferably pre-warmed to about 110° F.) may be delivered into the chamber 10 through a pipe 11 and after treatment it may be drawn through a valved pipe connection 12, and the pressure within the chamber 10 may be regulated by a valved vent pipe 13.

Steam is delivered into the chamber 10 through a valved supply pipe 14 which communicates with a vertically disposed tubular shaft section 15 adapted to rotate upon its axis with its lower end closed and tapered at 16 to form a point bearing contact with a recessed bearing block 17 at the bottom of the chamber.

The shaft section 15 is provided with radial branches 20 which may be arranged in groups, with those of each group in a common horizontal plane, but radially divergent. These branch pipes 20 each carry one or more distributing chambers or barrels 27, each having at its respective ends paired nozzle flanges 28 and 29 which form nozzle chambers in communication with the interior of the barrel through ports 30.

These nozzle flanges 28 and 29 have convergent outer margins substantially in contact and one of the flanges is rotatively connected with the barrel. By drilling through the contacting margins with a drill approximately .05 inch in diameter and then rotating one flange upon the other to a slight extent, a series of semi-circular nozzle apertures 30 are provided, each of which is approximately one-half of the diameter of the drill. Thus each set of nozzle flanges provides for a large number of small steam jets and by giving the outer margins of the flanges a conical pitch in the same direction for all nozzles, the lateral pressure of the steam may be utilized to rotate the entire structure, including the supply pipe 15, below the stuffing box 31, in a direction opposite that in which the steam is delivered.

The axes of the nozzles may extend in a general horizontal direction and by having two nozzles on each barrel 27, it is obvious that the conical jets will overlap in spaced relation to each other and all of the nozzles and steam jets will move with a sweeping action through the liquid or liqui-form material. The pipe 15 may be positively driven from a pulley 18.

It will, of course, be understood that any solid materials contained in the liquid will necessarily be very finely subdivided before treatment in the chamber 10 and will be in a condition to be held in suspension in the more liquid portions of the mixture. Sufficient food material should be introduced into the chamber 10 to cover the nozzles to a substantial depth, preferably to a point above the lower end of the supply pipe 11, and the vent 13 may be sufficiently closed to allow a pressure of from 6 to 19 pounds to build up within the chamber as hereinbefore explained, whereby a temperature of about 230° F. to 240° F. may be developed.

The capacity of the supply main 15, its branches 20, nipples 25 and nozzle barrels 27, will be such as to maintain sufficient excess pressure at the nozzle outlets 30 to ensure steam delivery into the material at a high velocity, preferably at the maximum velocity attainable in an ordinary nozzle aperture, i. e.—a velocity of approximately 1400 feet per second. Under these conditions both sterilization and stabilization are accomplished in milk.

It will be obvious that the nozzle structure above described makes possible an almost unlimited multiplication of nozzles adapted to deliver steam in fine jets, each having a constantly changing path different from that of any other jet and, owing to the high velocity of these jets, it is obvious that the material will be violently agitated and all portions thereof reached in an exceedingly short period of time. In fact, the material may be completed sterilized, the globulin destroyed the albumen redispersed as above explained, and the casein and casein-like material stabilized within 2 or 3 minutes after opening the steam supply pipe to deliver steam at a pressure of from 25 to 50 pounds gage pressure, the 50 pound pressure being preferred.

Upon conclusion of the steam treatment as above explained, the material will be delivered through the valved pipe 12 into a cooling chamber 32 having its upper portion connected by a pipe 33 with a condenser indicated conventionally at 34, the cooling in this chamber being accomplished by evaporation. The material is then delivered from the bottom of this chamber through the valved pipe connection 35 into a concentrating chamber conventionally illustrated at 37, with a vapor outlet 38 and a valved delivery spout 39 through which the material may be delivered into suitable receptacles when concentrated to a point where it will hydrate, solidify or jell upon cooling to normal atmospheric temperature.

Figure 4:
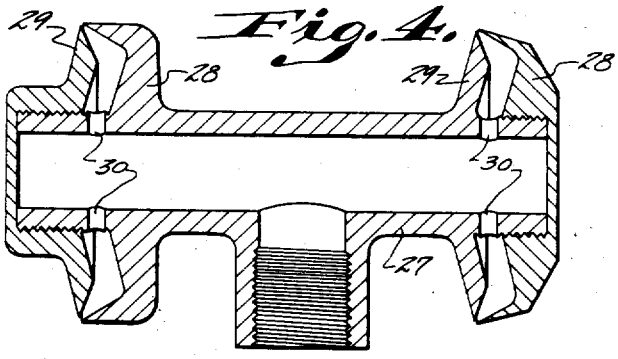
Figure 4 is a section taken on line 4—4 of Figure 3.

In using apparatus like that disclosed in Figure 4, the material may be delivered through a pipe 45 into a cylinder 46 having its axis horizontally disposed and provided with a drum 47 having internal longitudinal passages 48 and an external helical conveyor flight 49, the outer margin of which is in substantial contact with the interior surface of the cylinder wall. A body of milk may be maintaind in this chamber at substantially the level of the axis of the drum 47 and sweeping jets of steam may be injected into the milk underneath the drum through a series of nozzles 50. The drum may be actuated from the pulley 51. Steam may be successively delivered to the drum passages 48 through the pipe 52, and a port or nipple 53 in the cap plate 54 connected with the frame. The longitudinally extending drum passages 54 successively register with the supply port 53.

The milk may be continuously delivered through an outlet 55 into an evaporating chamber 56, the latter being associated with a concentrating reservoir conventionally shown at 57.

Steam escaping from the surface of the milk in the cylinder 46 passes upwardly from between successive turns of the conveyor flight and through tubular passages 61 into the steam chamber 62 and thence to a vacuum chamber or other point of delivery through the pipe 63. The chamber 62 is preferably provided with a series of baffles 64, whereby any milk carried upwardly by the steam may be collected and returned through the pipes 61 to the cylinder 46.

In the use of this apparatus, small portions of milk are subdivided from the remainder by the drum 47 and the downwardly extending portions of the successive turns of the conveyor flight and are separately treated by sweeping jets of steam while being moved longitudinally of the cylinder by the conveyor. The velocity of the steam jets causes such a violent agitation that by the time the outlet is reached, all particles of the milk will have become sterilized, either by direct impact of steam, or by reason of the exceedingly rapid rise of temperature. The temperature rise will be extremely rapid, not only because of the segregation of the different portions of the milk in comparatively small quantities and the distribution of the steam accomplished by the sweeping action of the jets, but also by reason of the fact that no pressure is allowed to build up within the cylinder to a degree which would interfere materially with the velocity of the steam jets or with the continuous and rapid passage of hot steam through the shallow body of segregated milk.

Figures 5, 6:
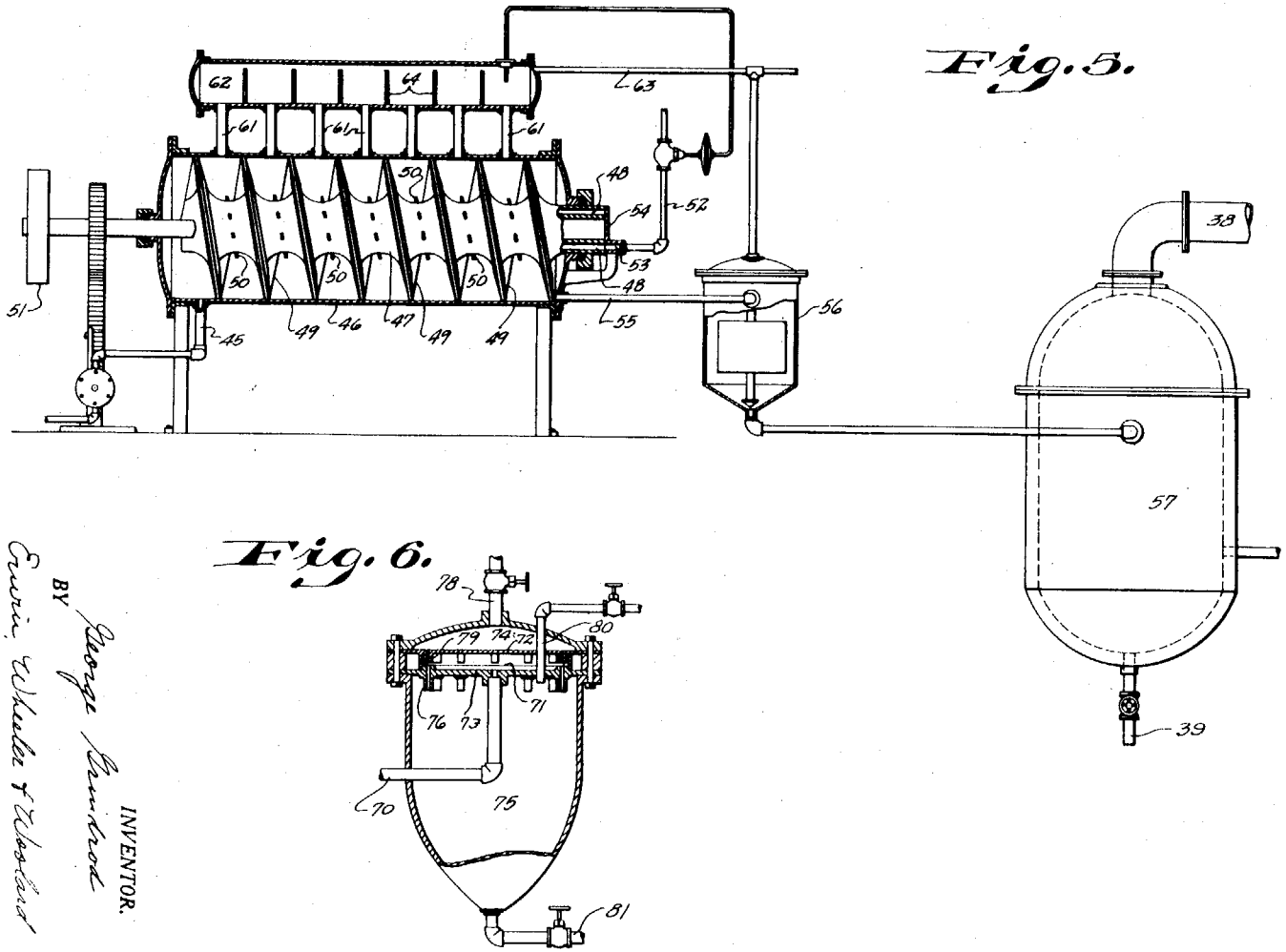
Figure 5 shows conventionally an apparatus like that disclosed in my Patent No. 2,020,309.
Figure 6 is a sectional view showing a further modification of a portion of the apparatus, as disclosed in my Patent No. 1,819,023.

In substitution for either the chamber 10 shown in Figure 1 or the cylinder 46 shown in Figure 5, I may employ a chamber or a series of superposed chambers of the type shown in Figure 6 in which the material may be delivered through a supply pipe 70 into a chamber 71 having top and bottom walls 72 and 73 respectively, which separate the chamber 71 from a super-posed steam chamber 74 and a lower chamber 75 which receives the treated material from the chamber 71 through a series of nozzles 76 extending through the bottom wall 73 of the chamber 71.

Steam is supplied to the steam chamber 74 through the valved pipe connection 78 and is delivered to the chamber 71 through a series of nozzles or nozzle apertures 79, each of which is axially aligned with one of the nozzles 76 with its outlet spaced from the inlet of the associated nozzle 76. The material is delivered into chamber 71 in such a manner that it flows across the upper ends of the nozzles 76 in the form of a thin film and is blown through the nozzles 76 by the steam jets which pass through the associated nozzles 79.

The steam jet nozzles 79 are preferably made approximately .05 of an inch in diameter. The passages through the nozzles 76 are of somewhat larger diameter, these passages being made large enough to reasonably allow the material to be blown freely through them by the steam jets. I prefer to employ small jets of steam and to associate with them nozzles 76 of such size that substantially every particle of the film of material may be brought into contact with the surface of the steam jet, whereby each living organism will be directly subjected to the searing and impactive effect of a particle of the heated steam.

The surface area of each steam jet increases in inverse proportion to its diameter and, therefore, by employing multiple small jets the effectiveness of a given volume of steam may be greatly increased over the effectiveness of the same volume if discharged through larger nozzles, the work being done at the surface of the jet where it contacts with the film of material to be projected into the chamber 75 through the nozzles 76.

Sufficient pressure may be allowed to build up within the chamber 75 to produce a sterilizing atmosphere above the material in that chamber, the pressure being controlled by the valved vent pipe 80.

After a quantity of the treated material has accumulated in the chamber 75 it may be continuously drawn off through the valved outlet duct 81 which may be assumed to lead to a cooling chamber similar to the cooling chamber 32 shown in Figure 1 and from which the material may pass to a concentrating chamber similar to the chamber 37 shown in that view.

In the use of the construction shown in Figure 6 it is possible to subject every particle of the material to exactly the same impact and heat treatment that every other particle receives instead of depending upon churning effects to bring the particles in line with the rapidly moving particles of steam.

Insofar as sterilization is accomplished by heat, it is due largely to the resultant rapid rise in temperature at a rate beyond the power of adaptation of living organisms, (and also to searing contacts), as distinguished from sterilizing processes in which sterilization is accomplished by prolonged cooking at a temperature above that at which life can be maintained. Therefore, indedependently of impactive effects, it is possible to effect complete sterilization in a very short period of time, although the high velocity steam jets are needed to obtain the necessary rate of temperaure rise and to destroy the globulin, redisperse the albumen and stabilize the casein as above explained.

Figure 2:
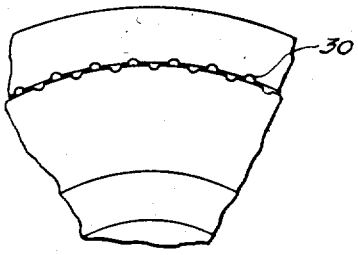
Figure 2 is a fragmentary view of one of the nozzles.

After stabilizing the casein by the above described steam treatment, the milk received in the reservoir 37 (Figure 1) or in the reservoir 57 (Figure 2) may be concentrated to approximately 50 to 65 per cent total solids, at which point it will become a hydrated colloid and may be allowed to flow into containers wherein it will jell when cooled to normal atmospheric temperature. This degree of concentration is considerably in excess of that contemplated in any of the processes described in my above mentioned former applications and is also considerably greater than that involved in the production of what is commercially known as evaporated milk. Also it is less than that required for the production of dry milk powder, it being essential that sufficient water be present to form the hydrated colloid and that no excess water be present. Such jellies may be produced in many instances and from various materials even though the steam temperature may not have been sufficient, or the treatment sufficiently prolonged to effect complete sterilization.

It is of great importance to the success of the process herein described that the particles of milk should be more uniformly, equally and momentarily subjected to steam impact than is possible by kettle or batch treatment in which steam may be introduced into the bottom of a container. Such apparatus may be used, if a sufficient number and distribution of small steam jets are provided for, and a proper pressure maintained at the jet nozzles to develop the required velocity. However, in the use of such apparatus, handling large quantities of material, it is hardly possible to provide a sufficient number of steam jets to avoid so called hit or miss effects and considerable care must be used in order to maintain the steam velocity required for a sufficient destruction of the globulin, redispersion of the albumen and stabilization of the casein to permit hydration without coagulation and precipitation; also the treatment is necessarily prolonged in proportion to the volume of milk to be treated, in order to ensure that all particles receive the treatment, and this requires an exposure to heat for an undesirably long period.

The structures disclosed in the drawings hereof are calculated to greatly reduce the time interval for exposure of any given particle of milk, either to steam impacts or heat, and to insure the presentation of each particle of milk to steam impact in minute subdivision, thereby reducing to a minimum the time required for stabilization, and more completely avoiding chemical and flavor changing effects.

It will, of course, be understood that in the apparatus disclosed, the surface area of each steam jet is very large in proportion to its cross sectional area because of the small size of the nozzle through which the jet is delivered. This relatively large surface area insures maximum efficiency in proportion to the volume of steam delivery and quantity of milk treated. By utilizing the kinetic energy of the steam to agitate the milk much more violently than it could be agitated by a mere boiling operation, and the conical divergence of the nozzles of each jet, the overlapping of the jets of the paired nozzles, and their movement along circular paths all contribute to expedition, certainty and uniformity in the subjection of all particles of material to like impactive and heat treatment.

For these reasons it is possible to obtain with precision a sufficiently exact degree of casein stabilization and redispersion of albumen required for uniformly successful hydration of the colloid upon proper concentration.

Whether this quality of hydration is entirely due to the absence of globulin and the redispersion of albumen, or whether it is also due to changes in the casein itself, my experiments have demonstrated that if milk in the fluid state is treated properly by the steam impact process as herein set forth, and particularly if the above stated requirements for uniform treatment of all particles of milk by direct contact of high velocity steam particles therewith and the time interval of exposure to heat reduced in the manner made possible by that process, the following changes will occur, viz:—

(1) The globulin of the milk is destroyed as shown by biological test.

(2) The albumen is partly absorbed upon the fat and partly redispersed as a stable colloidal solution.

(3) All bacteria and their spores may be destroyed.

(4) The flavor is not impaired.

(5) The casein is very resistant to coagulation by any agent.

(6) The milk can be concentrated in a vacuum to any degree desired and will not coagulate as does ordinary milk.

(7) If the milk be concentrated, it becomes a thick syrup while warm. On cooling, it undergoes a transformation, jells, becomes translucent or clear yellow, not milky, and becomes a distinct jelly. If passed through a homogenizer while warm, it jells almost instantaneously. It leaves the homogenizer as a syrup, but jells in the container even before cooling. The jelly has been found to remain unchanged for months at room temperature, even when left in an open container.

(8) On addition of water, the jelly loses its clear translucent appearance and reverts to milk, unchanged in original flavor. The product is completely soluble, and has no coagulation.

The herein described process has obvious advantages for concentrating and transporting whole milk. The milk may be gelatinized, shipped without refrigeration, and then diluted back to its original condition, whereupon it looks and tastes like fresh milk and has the same nutritive qualities.

While the success of the process and the success of making any stable, gelatinized product depends to a great extent on killing the bacteria in it, it is not necessary that absolute sterility be produced in all cases. Success in making these products depends, in the case of milk particularly, first on the ability to change the colloidal structure of the proteins of milk so that the casein is capable of entering the condition of a hydrated colloid and staying in this condition. Products of great value may be made as a result of this change in the structure of the casein, even though they are not absolutely sterile. The invention is primarily a means of changing colloidal structure, and secondarily a use of sterility or such a degree of sterility as will make the product keep for such a time as to permit its commercial use.

Absolute sterility in such a product is, of course, an ideal condition; but still it is a fact that these products may have great commercial value and yet not be entirely sterile. In many cases, it is merely necessary that the product have sufficient added keeping quality to be of commercial value as compared with the unstabilized foods of the same constitutent materials.

By using the fine jet steam nozzles and subjecting a raw ice cream mix to sufficient steaming to redisperse the albumen and globulin and then concentrating the product in a nickel apparatus, gelatinization, stability and complete hydration of the casein may be secured, but such a product might not be sterile. Expressing it in another way, the attainment of the change in colloidal structure which is responsible for complete hydration of the casein, does not necessarily parallel in time and temperature the destruction of bacteria. One might be accomplished, and the other not accomplished. Thus far, I have never used the process herein described to destroy all of the bacteria without at the same time producing the change in colloidal structure, but I have in some cases produced the change in colloidal structure without destroying all of the bacteria. If the maximum temperature attained is only 212°, for example, but if the flow of steam through the jets is continued for a longer time, the change in colloidal structure will take place, but all of the bacteria will not be destroyed. In the case of the ice cream mix hereinafter described, such a product may have sufficient keeping quality and thus have great commercial value. It will easily keep for two or three weeks if conditions are favorable, which is sufficient for its commercial use. It is an entirely practical product commercially.

In the case of some other protein materials, absolute sterility might be essential; in the case of others, sterility to the point of eliminating all of certain species of bacteria might be sufficient.

My process is applicable to many milk products containing sugar and chocolate or other modifications.

It has been found particularly advantageous in preparing a concentrated ice cream mix in jelly form. The ice cream mix, is stabilized and then concentrated to 75 to 80 per cent total solids. It is then a syrup. On cooling, or homogenizing, it becomes a jell and may be kept indefinitely in this form. Upon dissolving such a jelly in water, it reverts to the milky condition, but unlike the similar compositions prepared by other means, it is viscous. Also, this re-constituted mix requires less added gelatine or albumen to give it the viscosity and so-called texture desired for ice cream.

The gelatinized ice cream mix, under ideal conditions is made absolutely sterile, but not necessarily so. The value of the ice cream mix depends primarily on the change of structure of the casein, from soluble or coagulated casein into the hydrated casein which takes the product out of the liquid state, making it a jelly. The reconstituted mix made from this jelly then has superior qualities, owing to the fact that the casein has been completely hydrated, and on redissolving produces ice cream of finer texture than a produced by ordinary methods. The reconstituted mix also produces a full amount of over-run or swelling in the process of freezing without the use of the aging step, as is required for ordinary ice cream mix; whereas, ordinary ice cream mix as made by the methods heretofore employed has to be stored twenty-four to forty-eight hours at 40° F. to develop the condition producting over-run or swelling. The reconstituted mix possesses this quality at once on being redissolved, and possesses the over-run quality to a greater extent than does ice cream mix made by any other known method.

Another commercial advantage which has been readily apparent to ice cream manufacturers, is the fact that the gelatinized mix does not require the use of as much gelatine as does the mix made by prior methods. This brings about a saving of one and one-half to two cents per gallon, because it develops the same texture with less gelatin.

My process is also of value in making many chocolate products and candies, which are thereby caused to exist as jellies even with considerable water. They are essentially modified milk jellies in which the new form of casein is the gelatinizing agent.

Many other protein foods heretofore preserved only by drying or sterilizing in cans can be preserved by the same process as above described for milk. The steam impact methods of stabilizing the material and of destroying bacteria without chemical or flavor change, when sterilization in whole or in part is desired, make possible an extension of the process to many foods, some examples of which are as follows:

By the process herein described, gelatine may be rendered sterile without injury to its gelatinizing power, a result impossible to attain heretofore. Gelatin hydrates readily, but heretofore it could not be sterilized and therefore its hydration could not be utilized in making it keep. Gelatin has heretofore been preserved by dehydration and by this method only. But by the process above described, a sterile gelatine solution may be prepared, concentrated to about 30 per cent gelatin, delivered into containers and kept indefinitely. Commercially pure gelatin in the hydrated form is of little value, but the fact that gelatin can be sterilized has great commercial value in preserving foods.

Foods which cannot themselves be hydrated can nevertheless be sterilized with enough gelatin to protect them and can be kept in that way. Ground meat, sausage, for instance, may be mixed with water and gelatin, and sterilized. The mass is concentrated to its original consistency and solidifies to a jelly containing the meat, and as such it will not spoil even if left unsealed. It will mold if kept moist, but if either sealed or dried on the surface, it will keep. Even if the meat is not sterilized, it may be preserved for much longer periods than was heretofore thought possible.

Meat contains a limited amount of gelatin and some meat might contain enough gelatin to serve as its protective colloid, but in general, an additional quantity of gelatin or similar colloid should be added.

The following changes may occur in meat when so treated: Most of the albumen and globulin of the meat will probably be removed from the fiber and taken into solution. All such albumen and globulin will be completely redispersed—not coagulated, as in ordinary cooking. The proteins may thus be in part absorbed upon the surface of fat globules and in part redispersed in a new colloidal solution. Those fractions of the proteins which are coagulable, but which are not dissolved out of the fiber in the process may be simply coagulated within the fiber. A considerable part of the fibrous part of the meat may be mechanically disrupted and dispersed by the steam jets.

The effect of beef on sensitive individuals may thus be materially changed. There should be no reaction of food allergy in the case of any meat. There should be no sensitivity on the part of any individual to any kind of meat after the steam impact treatment, although many individuals are sensitive to and are even poisoned by certain kinds of meat, cooked in the ordinary manner.

Sterilization is a tool used in applying a new principle for preserving foods by hydration of the colloid. Whether the sterilization is absolute or not is immaterial so long as the particular product in question does not contain bacteria capable of growing in it. Thus, in the case of ice cream mix, a great many species of bacteria would not grow in it even if present. In the case of a material containing no sugar, certain of these species might grow in it but other species would not grow. Other products might have to be absolutely sterile, although it is unlikely that any product will be found which will support the growth of all species of bacteria. Each product is more likely to support the growth of only a few species and the absence of these particular ones must be assured for the product in question.

Any food which can be finely subdivided can thus be preserved by the steam impact treatment, and by embedding it in a colloid which will hydrate. Enough water should be added when necessary to make the mass fluid, whereupon the mixture may then be stabilized, concentrated and caused to jell as above described. Many cereals contain proteins which will hydrate, but heretofore it has been impossible to either stabilize or sterilize them and retain the property or hydration. But by this process they can be put into water solution, stabilized, sterilized completely or sufficiently, concentrated to the point required for hydration, and caused to keep as jellies. They may also be utilized as gelatinizing agents to preserve other materials.

The above described process provides a universal method for producing stable jellies, extending the principles of common jelly making, heretofore limited to an isolated example, to many food products. The ability to stabilize and sterilize without material thermal decomposition makes available many proteins as gelatinizing agents. If the original food does not already contain a protein capable of hydration, a suitable cereal protein or gelatin may be added, and the entire mass thus made susceptible to preservation in jelly form.

I claim:

1. The process of manufacturing stable food products, containing protein-like substances, consisting in subjecting the material to the action of steam jets having a temperature, velocity and position to uniformly reach and stabilize the food particles against coagulation prior to material thermal chemical change, immediately cooling the stabilized material to a point where thermochemical change will be avoided and then concentrating the material into a hydrated colloid and allowing it to jell.

2. The process of manufacturing protein containing jellies, consisting in subjecting the material to the direct action of flowing steam jets having a velocity, distribution and volume sufficient to raise the temperature within approximately two or three minutes above the boiling point in open atmosphere until the protein has been stabilized against coagulation and then concentrating it into a hydrated colloid in jelly form.

3. The process of manufacturing protein foods containing jellies, consisting in subjecting particles of protein containing material to redispersing impacts of particles having a high sterilizing temperature for instantly sterilizing the food and stabilizing the protein to prevent coagulation, and then concentrating the same into a hydrated colloid in jelly form.

4. The process of manufacturing permanently keeping foods, consisting in preparing a liquiform mixture of solid food materials and protein-like material capable of being stabilized against coagulation by momentary contact with rapidly flowing steam, subjecting substantially all particles of the mixture to contact with such flowing steam until the same has been rendered colloidal by destruction of globulin, redispersion of albumen, and stabilization of casein-like material therein, and then immediately cooling the material to arrest thermal change and concentrating it to a point where the colloidal portions will jell.

5. The process of manufacturing foods having an embedding material composed of protein-like substance in jelly form, consisting in subjecting material containing such substance to the stabilizing effect of momentary contact with a high velocity steam jet, immediately cooling the material below the point of thermo-chemical and flavor change, and concentrating it into a hydrated colloid of said protein-like substance whereby other substances in said material may be embedded and protected against decomposition.

6. The process of manufacturing sterile foods in jelly form, consisting in injecting steam at high velocity directly into food containing protein-like material and allowing it to escape with sufficiently restricted freedom to maintain a sterile atmosphere over the material while avoiding the development of velocity checking pressure, bringing substantially all portions of the food material into direct contact with the steam before thermochemical and flavor changing effects are developed, then immediately cooling and concentrating the material to a degree where hydration of the protein-like material will occur.

7. A protein containing food in which the coagulable portions have been stabilized against coagulation and converted into a hydrated colloid.

8. Milk in the form of a non-coagulated jelly, soluble in water without coagulation, in which the albumen is redispersed and in which the casein is more resistant to coagulation than the casein of untreated milk.

9. The process of treating liqui-form food material which consists in subjecting the particles with substantial uniformity to the action of jets of steam at a sterilizing temperature moving at the high velocity developed in a nozzle under a substantial pressure head, and then immediately cooling and concentrating the material to a degree permittinng hydration.

10. The process of treating liqui-form food material, which consists in subjecting the particles of material with substantial uniformity to the impactive and searing effects of steam jets having sufficient velocity and temperature to redisperse albumen and sterilize the material with sufficient rapidity to stabilize normally coagulable material before thermally induced chemical and flavor changing reactions have occurred, and then immediately reducing the temperature of the material to prevent such changes and concentrating the same to a consistency promoting hydration.

11. The process of preserving milk and milk compounds consisting in flowing steam therethrough in volume and with a temperature and velocity and in a sufficiently sterilizing atmosphere to stabilize the casein and sterilize the material before substantial chemical and flavor changing reactions have taken place, and then immediately cooling and concentrating the material to a degree promotive of hydration.

12. In the manufacture of a jellied ice-cream mix, the method of treating a raw ice-cream mix which consists in subjecting the mix to the action of high velocity steam jets of the kind described to so condition the mix as to cause the casein content to form a jelly structure when certain conditions of concentration and temperature are obtained, cooling the mix to prevent thermo-chemical change, and varying the water content to cause the casein to form a jelly structure at or above atmospheric temperature.

13. A process of manufacturing a food product consisting in treating raw material containing water and casein to the direct action of high velocity steam jets of the kind described to leave the product in such a condition that when cooled to atmospheric temperature and concentrated to a certain degree the casein present forms a jell with the water content without coagulation; quickly cooling the material after the steam jet treatment to avoid thermo-chemical change; and varying the free water content available to the casein to cause it to form a jelly structure when the product is at or above atmospheric temperature.

14. In the manufacture of a food product, the method of treating raw material containing milk as one component, which includes the steps of subjecting said material to the direct action of high velocity steam jets so to change the albumen and casein content that when the product is cooled and concentrated to a desired degree the casein forms a jelly structure without coagulation; thereafter cooling the steam-treated material to prevent undesirable thermo-chemical change; and varying the free water content available to the casein to cause the casein to form a jelly structure when the product is at or above atmospheric temperature.

15. A milk-containing product in the form of a jelly soluble in water, the albumen content of said product being in uncoagulated and redispersed form, the casein content forming the predominant jelly structure.

16. As a product of manufacture a concentrated ice-cream mix in the form of a jelly and in which the natural protein content is sufficiently stabilized against coagulation to resist coagulation in the concentrated state.

17. A product of manufacture, a concentrated ice-cream mix containing those solid constituents normally present in ice-cream but concentrated approximately to one-half the volume of a natural liquid ice-cream mix, and in which the protein constituents are stabilized against coagulation whereby coagulation and deterioration of the product are offset.

GEORGE GRINDROD.